United States Patent [19]

Maehara

[11] Patent Number: 5,219,210
[45] Date of Patent: Jun. 15, 1993

[54] BRAKE FLUID PRESSURE CONTROLLER FOR VEHICLE

[75] Inventor: Toshifumi Maehara, Saitama, Japan

[73] Assignee: Akebono Brake Industry Co., Ltd., Tokyo, Japan

[21] Appl. No.: 807,701

[22] Filed: Dec. 16, 1991

[30] Foreign Application Priority Data

Dec. 17, 1990 [JP] Japan .................. 2-411117

[51] Int. Cl.⁵ .......................... B60T 8/34
[52] U.S. Cl. ...................... 303/9.62; 188/349;
303/100; 303/103; 303/113.5; 303/111;
303/116.1; 303/119.1; 303/900
[58] Field of Search ................ 303/103–111,
303/113 R, 113 SS, 113 AP, 116 R, 119 R,
DIG. 5, DIG. 4, 119 SV, 9.62–9.75, 95–99, 100,
93, 24.1, ; 188/349, 181 C; 364/426.02, 426.03,
426.01

[56] References Cited

U.S. PATENT DOCUMENTS

| 3,479,095 | 11/1969 | Lewis et al. ............... 188/349 |
| 3,608,978 | 9/1971 | Neisch ..................... 303/113 AP |
| 3,836,208 | 9/1974 | Wienecke ................. 303/DIG. 5 |
| 3,866,983 | 2/1975 | Kondo ..................... 303/DIG. 5 |
| 4,116,493 | 9/1978 | Hayashida ................ 303/9.68 |
| 4,418,966 | 12/1983 | Hattwig ................... 303/100 |
| 4,652,060 | 3/1987 | Miyake .................... 303/111 X |
| 4,657,310 | 4/1987 | Klein ...................... 303/119 R |
| 4,714,299 | 12/1987 | Takata et al. ............ 303/113 AP |
| 4,715,667 | 12/1987 | Otsuki et al. ........... 303/119 R |
| 4,755,008 | 7/1988 | Imoto et al. ............ 303/111 X |
| 4,762,376 | 8/1988 | Matsubara ............... 303/96 X |
| 4,765,692 | 8/1988 | Miyake .................... 303/DIG. 5 |
| 4,826,257 | 5/1989 | Burckhardt et al. .... 303/111 |
| 4,836,618 | 6/1989 | Wakata et al. .......... 303/111 X |
| 4,883,325 | 11/1989 | Shimanuki et al. ...... 303/100 X |
| 4,930,846 | 6/1990 | Miyake et al. .......... 303/24.1 X |
| 4,943,123 | 7/1990 | Takeda et al. .......... 303/111 |
| 4,962,971 | 10/1990 | Miyake .................... 303/9.62 X |
| 4,969,696 | 11/1990 | Yogo et al. .............. 303/108 X |
| 4,986,611 | 1/1991 | Goshima et al. ........ 303/100 |
| 5,021,957 | 6/1991 | Yoshino et al. ......... 303/97 X |
| 5,082,333 | 1/1992 | Fukushima et al. ..... 303/109 X |

FOREIGN PATENT DOCUMENTS 0042363 2/1991 Japan .................. 303/113 AP

Primary Examiner—Douglas C. Butler
Attorney, Agent, or Firm—Cushman, Darby & Cushman

[57] ABSTRACT

To dispense with a proportioning valve for the rear wheel brake fluid pressure line system of a brake anti-locking controller for a vehicle to reduce the cost of the controller. A brake fluid pressure controller comprises a controller for opening and closing the hold valves of a rear wheel brake fluid pressure line system at the time of brake fluid pressure increase after the start of braking of the vehicle but before the start of the brake anti-locking control thereof in order to keep the rate of the break fluid pressure increase in the rear wheel brake fluid pressure system lower than that of the brake fluid pressure increase in the front wheel brake fluid pressure line system.

4 Claims, 5 Drawing Sheets

BRAKE FLUID PRESSURE CONTROLLER FOR VEHICLE

BACKGROUND OF THE INVENTION

1. Field of the Invention

The present invention relates to a brake fluid pressure controller for vehicles that have a brake anti-locking control means.

2. Description of the Prior Art

It is known that a brake fluid pressure control valve, which is called a proportioning valve and decreases the pressure of incoming brake fluid entering the valve at a prescribed rate in order to increase the pressure applied to the brake fluid leaving the valve, is provided in the rear wheel liquid fluid pressure line system of a vehicle in order to approximate the distribution of the front and rear braking force of the vehicle to an ideal one, as disclosed in the U.S. Pat. No. 3,479,095.

Such a proportioning valve is also provided in a vehicle having a brake anti-locking controller, as disclosed in the U.S. Pat. No. 4,652,060. The valve functions so that the braking force applied to the front wheels of the vehicle and that applied to the rear wheels thereof are of equal magnitude, as the braking force in the front and the rear wheels is less than a prescribed magnitude at the initiation of braking of the vehicle. It also functions in such a manner that the braking force applied to the rear wheels is made lower in magnitude than that applied to the front wheels, as the respective magnitudes of braking force are equal to or higher than the prescribed magnitude after the initial stage of the braking, thus approximating and comparing the times for locking the front wheels as well as locking the rear wheels with each other in order to prevent the loss of initial braking force and premature anti-locking control of the rear wheels.

Another such proportioning valve has an inertia member fitted with an inertial valve action element for cutting off the transmission of brake fluid when a prescribed rate of deceleration is applied to the member, as disclosed in the U.S. Pat. No. 4,116,493. As for a vehicle such as a truck, which differs much in ideal distribution of braking force between the loaded and unloaded states of the vehicle, the pressure of brake fluid, which is decreased by yet another proportioning valve, is altered depending on the load in the vehicle in such a manner that the pressure of the brake fluid, which initiates and controls the braking force for the rear wheels of the vehicle, is increased in accordance to an increase in the load on the vehicle, thus providing the valve with a braking force distributing property responsive to the load as shown in FIG. 6 of U.S. Pat. No. 4,116,493.

SUMMARY OF THE INVENTION

The brake fluid pipe system of a vehicle provided with the proportioning valve, especially that of a vehicle provided with the deceleration-sensitive, load-responsive proportioning valve having the inertial valve action element, is rather complicated. Also, the proportioning valve is relatively expensive and increases the cost of the vehicle due to the installation of the anti-locking controller.

Therefore, to simplify both the embodiment as well as cost, the present invention comprises a brake anti-locking controlling means, which prevents the wheels of a vehicle from locking while braking on the low-friction coefficient surface of a road, thereby securing the steering capability and stable movement of the vehicle, as well as shorten the braking distance thereof. The brake anti-locking controlling means also includes a modulator which has hold valves, constituted by solenoid valves which apply and maintain pressure of brake fluid in cylinders for application to the wheels of the vehicle, and decay valves constituted by solenoid valves which decrease the pressure of brake fluid applied to the wheels. On the basis of electric signals received from wheel speed sensors, indicative of the speed of the individual wheels, the microcomputer of the controller performs to either open or close the hold valves and the decay valves in order to either increase, maintain or decrease the pressure of the brake fluid in the wheel cylinders.

Accordingly, it is an object of the present invention to provide a brake fluid pressure controller for a vehicle having an anti-locking controller without a proportioning valve yet incurring no reduction of effectiveness.

The brake fluid pressure controller of the present invention includes a control means for opening and closing the hold valves of a rear wheel brake fluid pressure line system at the time of a rise in the brake fluid pressure after the start of braking of the vehicle and before the start of the anti-locking control, thereby keeping the rate of the rise in the brake fluid pressure in the rear-wheel system lower than that of the rise in the brake-fluid pressure in the front wheel brake fluid pressure line system.

DETAILED DESCRIPTION OF THE PREFERRED EMBODIMENT

Figure 1:
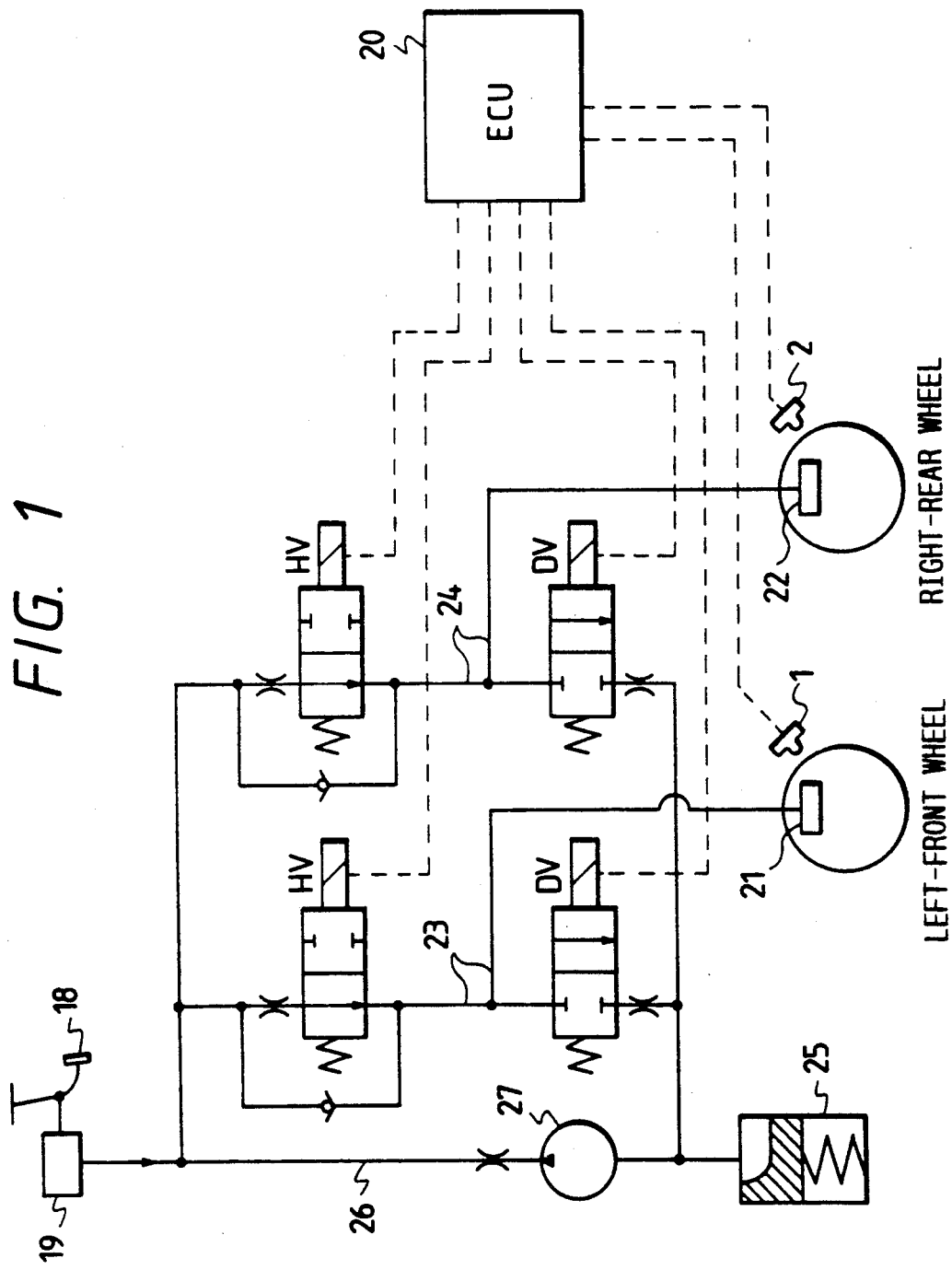
FIG. 1 is a schematic view of a brake fluid pressure controller according to the present invention.

FIG. 1 is a schematic view of the present invention, a brake fluid pressure controller for a vehicle. For simplification, FIG. 1 shows only a cross-piped brake fluid pressure line system for the right rear wheel and left front wheel of the vehicle. The vehicle includes hold valves HV which are normally open solenoid valves, decay valves DV which are normally closed solenoid valves, a brake pedal 18, a master cylinder 19, which is operated by the pedal and is connected to a wheel cylinder 21 for the left front wheel and a wheel cylinder 22 for the right rear wheel through fluid passages 23 and 24 provided with the hold valves HV and connected to a reservoir 25 through the decay valves DV, and a brake fluid pressure pump 27 provided in a fluid passage 26 between the reservoir and the master cylinder. The brake fluid pressure controller includes a control unit 20 made of a microcomputer in the main.

The opening and closing of the hold valves HV and the decay valves DV are controlled by command signals sent out from the control unit 20. The control unit acts to open and close the hold valves HV and the decay valves DV on the basis of signals sent out from speed sensors 1 and 2 for the left front wheel and the right rear wheel, respectively, and are indicative of the speeds of the wheels. When the brake pedal 18 is depressed, as the hold valves HV and the decay valves DV remain de-energized as shown in FIG. 1, the pressure of brake fluid in the master cylinder 19 is transmitted to the wheel cylinders 21 and 22 through the fluid passages 23 and 24 to increase the pressure of the brake fluid in the wheel cylinders. If the brake anti-locking control of the vehicle is then started, the hold valves HV perform to close the fluid passages 23 and 24 in order to maintain the pressure of the brake fluid in the wheel cylinders 21 and 22. When the decay valves DV thereafter open, the brake fluid in the wheel cylinders 21 and 22 flows therefrom to the reservoir 25 via the decay valves so that the pressure of the brake fluid in the wheel cylinders is decreased.

Figure 2:
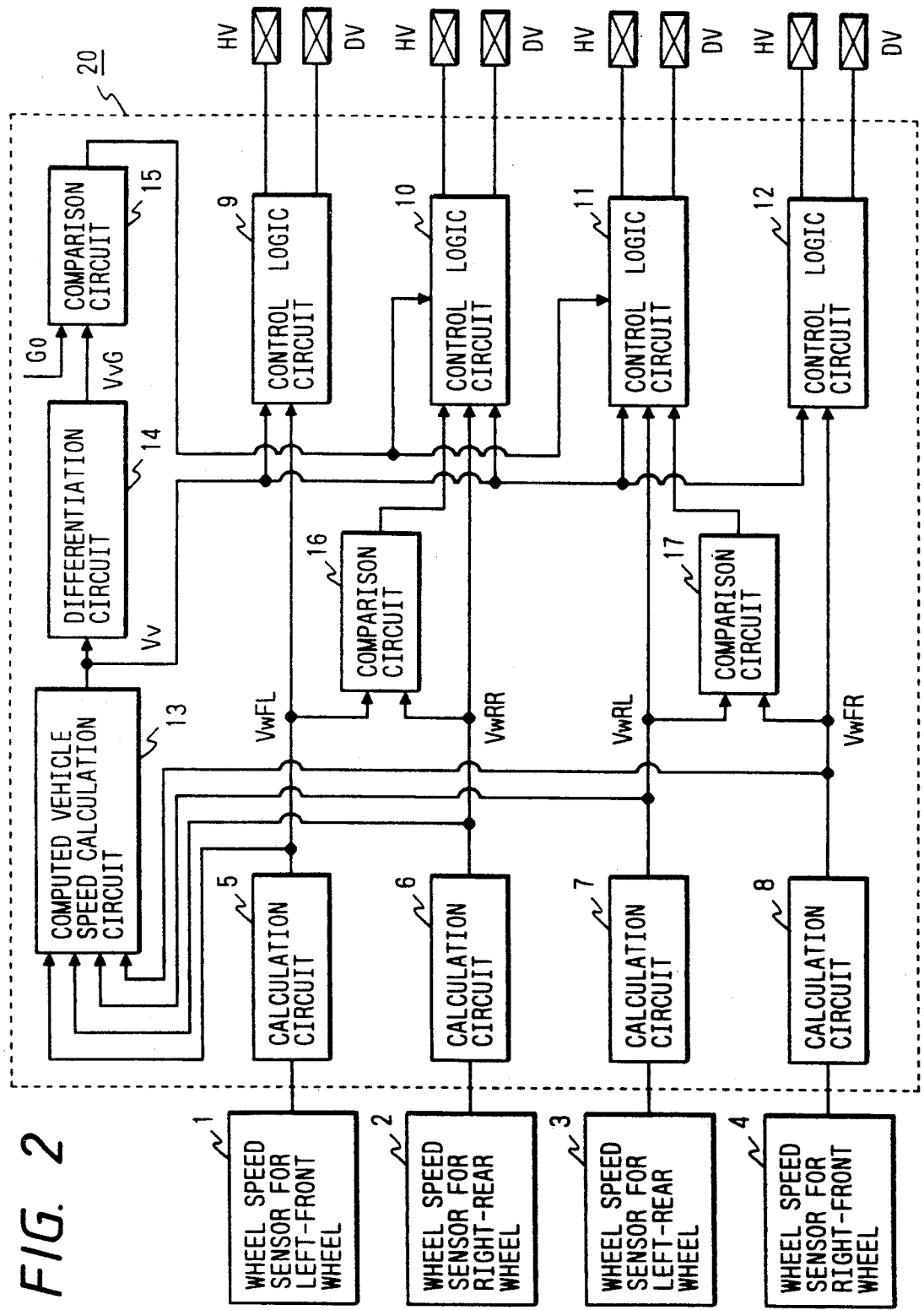
FIG. 2 is a block diagram of the control unit of the brake fluid pressure controller.

FIG. 2 is a block diagram of the control unit 20 including calculation circuits 5, 6, 7 and 8, control logic circuits 9, 10, 11 and 12, a computed vehicle speed calculation circuit 13, a differentiation circuit 14, and comparison circuits 15, 16 and 17. Wheel speed sensors 1, 2, 3 and 4 provided for the left front wheel, right rear wheel, left rear wheel and right front wheel of the vehicle, respectively, send out AC signals whose frequencies change in proportion to the rotation speeds of the wheels. The calculation circuits 5, 6, 7 and 8 receive the AC signals from the wheel speed sensors in order to perform calculations to generate signals indicative of the respective wheel speeds $VwFL$, $VwRR$, $VwRL$ and $VwFR$. The electric signals are sent to the control logic circuits 9, 10, 11 and 12 as well as the computed vehicle speed calculation circuit 13, which calculates a computed vehicle speed $Vv$ approximate to the actual speed of the body of the vehicle. The computed vehicle speed is a constant and uniform speed of acceleration or deceleration. For the calculation of the computed vehicle speed $Vv$, the highest of the four wheel speeds $VwFL$, $VwRR$, $VwRL$ and $VwFR$ is selected, and the limit to the rate of the decrease in the other lower wheel speed relative to the highest is set at a prescribed value such as $-1$ g. The computed vehicle speed $Vv$ is applied to the control logic circuits 9, 10, 11 and 12, which operate, dependent on the basis of the four wheel speeds as well as the computed vehicle speed, to open or close the hold valves HV and decay valves DV of the brake fluid pressure line systems for all the wheels of the vehicle to increase, maintain or decrease the pressure of the brake fluid in the wheel cylinders for all the wheels to perform the anti-locking control of the vehicle in a conventional manner.

The differentiation circuit 14 differentiates the computed vehicle speed $Vv$ to determine the rate $VvG$ ($dVv/dt$) of the decrease in the speed. The comparison circuit 15 compares the rate $VvG$ with a preset deceleration rate $Go$. The other comparison circuit 16 compares the left front wheel speed $VwFL$ with the right rear wheel speed $VwRR$. The remaining comparison circuit 17 compares the right front wheel speed $VwFR$ with the left rear wheel speed $VwRL$. The outputs from the comparison circuits 15 and 16 are applied to the control logic circuit 10 for the brake fluid pressure lines for the right rear wheel. The outputs from the comparison circuits 15 and 17 are applied to the control logic circuit 11 for the brake fluid pressure lines for the left rear wheel.

Figure 3:
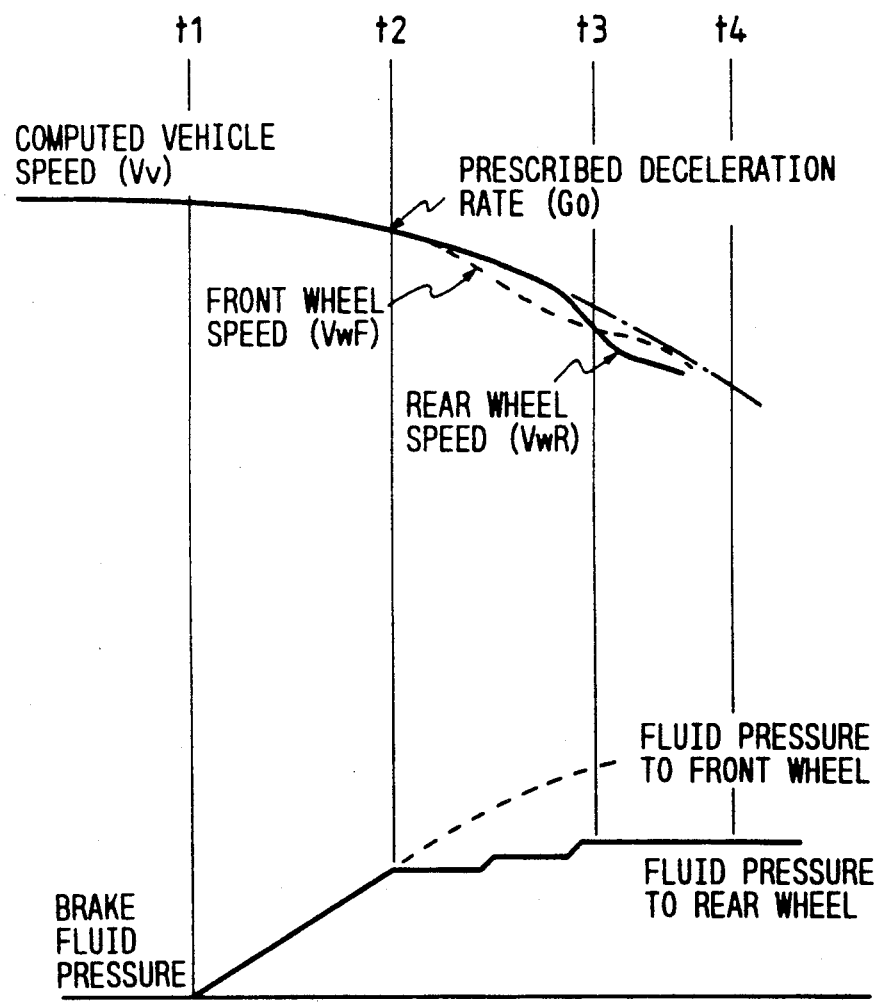
FIG. 3 is a time chart of the controller to illustrate the operation thereof.

The control logic circuits 10 and 11 monitor the outputs from the comparison circuits 15, 16 and 17 throughout a period from a time point t1 which is shown in FIG. 3 and at which the brake pedal 18 begins to be depressed, to a time t4, which is also shown in FIG. 3, and at which time the anti-locking control is started. At time t2, at which the rate $VvG$ of the decrease in the calculated vehicle speed $Vv$ is larger than the preset deceleration rate $Go$ and the rear wheel speed $VwR$ is higher than the front wheel speed $VwF$, the control logic circuits 10 and 11 act to energize and de-energize the hold valves HV at a preset duty factor to slowly increase the pressure of the brake fluid in the wheel cylinders for the rear wheels. The speeds of the rear wheels are thus controlled in such a manner that the rate of increase in the pressure of the brake fluid in the wheel cylinders for the rear wheels is less than the increase in pressure of brake fluid in the wheel cylinders for the front wheels in order to cause the speeds of the rear wheels to be as near as possible to the speeds of the front wheels. Since it is clear that the time at which the rate $VvG$ of the decrease in the computed vehicle speed $Vv$ becomes larger than the prescribed deceleration rate $Go$ depends on the load on the vehicle, the hold valves HV can thus be caused to perform nearly the same function as the above-mentioned deceleration-sensitive load-responsive proportioning valve.

Figure 4:
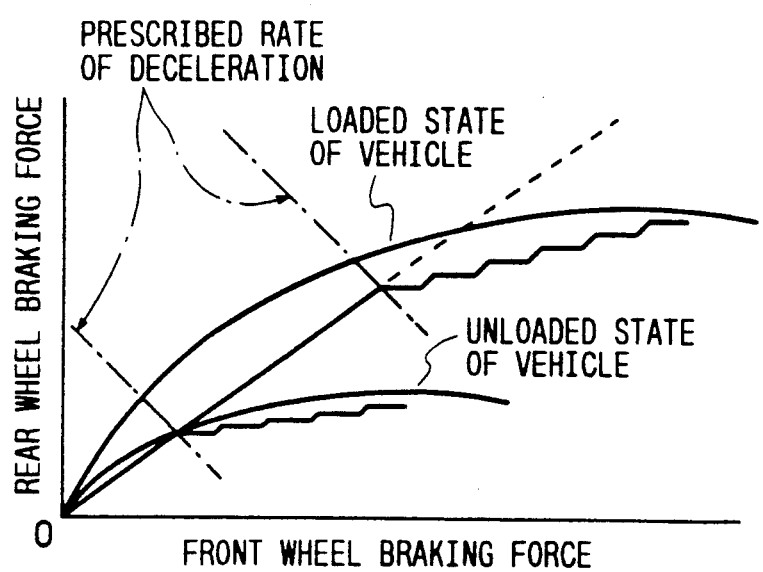
FIG. 4 is a graph of the controller to illustrate the relationship between front wheel braking force and rear wheel braking force.
Figure 6:
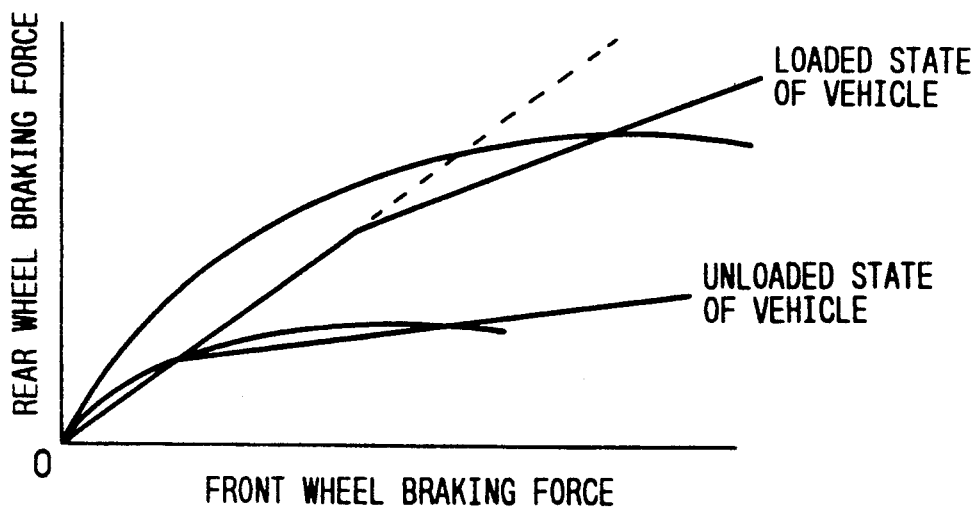
FIG. 6 is a graph of a conventional brake fluid pressure controller to illustrate the relationship between front wheel braking force and rear wheel braking force.

FIG. 4 shows the braking force distribution property of the brake fluid pressure controller. At a time which the rear wheel speed $VwR$ becomes lower than front wheel speed $VwF$, the control logic circuits 10 and 11 begin to act to keep the hold valves HV energized or closed in order to maintain the pressure of the brake fluid in the rear wheel cylinders to prevent the anti-locking control of the vehicle from starting too early on the rear wheels.

Figure 5:
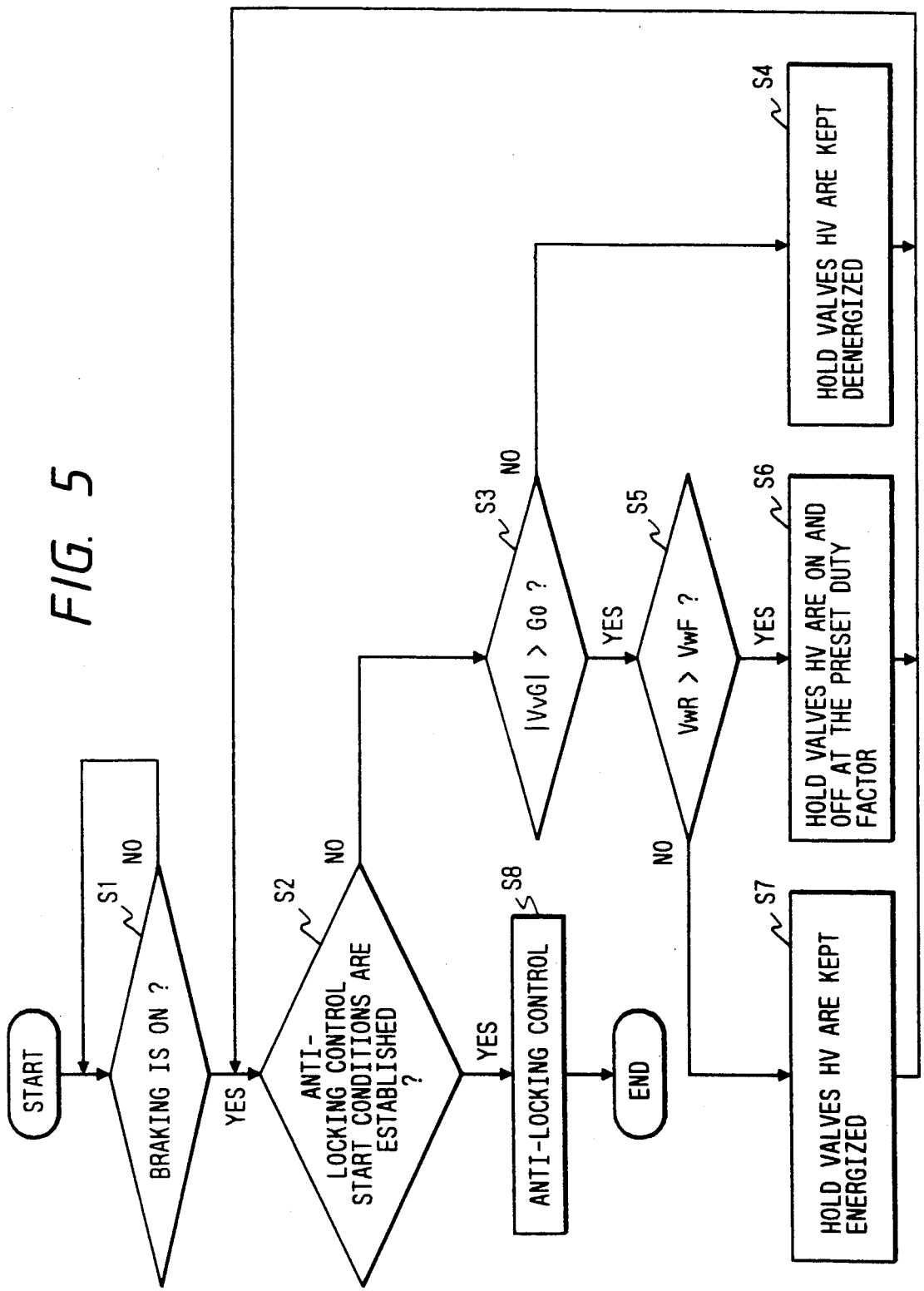
FIG. 5 is a flow chart of the controller to illustrate the operation thereof.

FIG. 5 is a flow chart of a control routine which is executed through the control logic circuits 10 and 11. In step S1 of the routine, it is judged whether the brake pedal 18 is depressed during the movement of the vehicle or not. If it is judged in step S1 that the brake pedal 18 is depressed during the movement of the vehicle, it is then judged in step S2 of the routine whether or not brake anti-locking control initiation conditions are established. If it is judged in step S2 that the conditions are not yet established, it is then judged in step S3, in terms of the output from the comparison circuit 15, whether or not the absolute value of the rate $VvG$ of the decrease in the computed vehicle speed $Vv$ has become larger than the preset deceleration rate $Go$. Until it is judged in step S3 that the absolute value has become larger than the preset rate $Go$, the pressure of the brake fluid in the rear wheel cylinders is increased in a conventional manner in step S4 of the routine while the hold valves HV are kept de-energized or open. After step S4, the brake anti-locking control initiation conditions of step S2 are evaluated once more. When it is judged in step S3 that the absolute value has become larger than the preset value $Go$, it is then judged in step S5 of the routine whether the rear wheel speed $VwR$ is higher than the front wheel speed $VwF$ or not. If it is judged in steps S3 and S5 that the absolute value has become higher than the preset rate $Go$ and the rear wheel speed $VwR$ is higher than the front wheel speed $VwF$, the hold valves HV are energized and de-energized at the preset duty factor in the step S6 of the routine to gradually increase the pressure of the brake fluid in the rear wheel cylinders as shown in FIG. 3. After the step S6 is taken, return to step S2. If it is judged in the step S5 that the rear wheel speed VwR has become equal to or lower than the front wheel speed VwF, the hold valves HV are kept energized in step S7 of the routine to maintain the pressure of the brake fluid in the rear wheel cylinders. Step 2 follows step S7. If it is then judged in step S2 that the conditions are established, the brake anti-locking control is started in step S8 of the routine.

According to the present invention, the hold valves of the rear wheel brake fluid pressure line system of a modulator provided for the brake anti-locking control of a vehicle are closed and opened according to a prescribed duty factor before the start of the brake anti-locking control so as to slowly increase the pressure of a brake fluid in the system, thereby enabling the hold valves to function similarly to the above-mentioned proportioning valve. For that reason, the proportioning valve can be dispensed with in order to reduce the cost of the modulator but without sacrificing effectiveness of the brake fluid piping thereof. If the operation of the hold valves is started on the basis of the comparison of the rate of the decrease in a computed vehicle speed and a preset deceleration rate as in the above-described embodiment, there is no loss in function, whatsoever, in comparison to that of the above-mentioned deceleration-sensitive load-responsive proportioning valve. The hold valves are well-suited to create an ideal property of braking force distribution.

What is claimed is:

1. A brake fluid pressure controller for a vehicle having front and rear wheels, a master cylinder for transmitting brake fluid pressure, rear wheel cylinders for applying said brake fluid pressure to said rear wheels, a brake fluid reservoir for holding excess brake fluid, and wheel speed sensors indicating individual speeds of said front and rear wheels, said brake fluid pressure controller comprising:

an anti-lock control means for generating command signals for controlling the individual functions of increase, maintenance or decrease in pressure of brake fluid in said rear wheel cylinders of said vehicle based on upon wheel speed signals received from said wheel speed sensors;

hold valves which, when activated by said command signals from said anti-lock control means, apply and maintain said pressure of brake fluid from said master cylinder in a corresponding rear wheel cylinder of said vehicle; and decay valves which, when activated by said command signals said from said anti-lock control means, decrease said pressure of brake fluid in said rear wheel cylinders of said vehicle by releasing brake fluid into said reservoir, wherein said control means controls the opening and the closing of said hold valves based on said wheel speed signals from individual wheel speed sensors to control brake fluid pressure in a time interval between initial braking of said vehicle and initiation of brake anti-locking control to keep an increase in pressure of brake fluid in a rear wheel cylinder lower than an increase in pressure of brake fluid in a corresponding front wheel cylinder based solely upon the electrical signals generated from the individual wheel speed sensors without the use of a brake fluid pressure control valve to regulate the distribution of brake fluid.

2. The brake fluid pressure controller of claim 1, wherein said anti-lock control means comprises:

calculation circuit means for receiving said individual wheel speed signals and generating electric signals corresponding to said respective wheel speeds;

computed vehicle speed calculation circuit means for receiving said electric wheel speed signals from said calculation circuit means and outputting a computed vehicle speed, a constant and uniform speed indicative of either acceleration or deceleration of said vehicle;

differentiation circuit means for receiving and differentiating said computed vehicle speed to determine a rate of decrease in said wheel speeds;

comparison means comprising:

a first comparison circuit means for generating a first comparison output of said rate of decrease in computed vehicle speed with a reference deceleration rate, a second comparison circuit means for generating a second comparison output of a front wheel speed with a rear wheel speed, and control logic means for receiving said first and second comparison outputs of said first and second comparison circuits, operating to either open or close said hold valves for said rear wheel cylinders to keep said increase in pressure of brake fluid in said rear wheel cylinders lower than said increase in pressure of brake fluid in said front wheel cylinders.

3. The brake fluid pressure controller of claim 2, wherein said control logic means maintains constant brake fluid pressure in said rear wheel cylinders by commanding said hold valves to close when said first comparison circuit means detects said computed vehicle speed being larger than said reference deceleration rate and said second comparison circuit means detects said rear wheel speeds being lower than said front wheel speeds.

4. The brake fluid pressure controller of claim 3, wherein said control logic means slowly increases brake fluid pressure in said rear wheel cylinders by commanding said hold valves to open and close according to a prescribed duty factor when said first comparison circuit means detects said computed vehicle speed being larger than said reference deceleration rate and said second comparison circuit means detects said rear wheel speeds being higher than said front wheel speeds.

* * * * *